Figure 1:
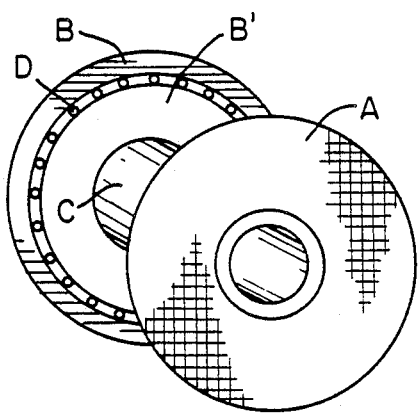

United States Patent [19]

Pedroia

[11] Patent Number: 4,991,792
[45] Date of Patent: Feb. 12, 1991

[54] REEL FOR TWINE FOR A MACHINE FOR TYING KNOTS

[76] Inventor: Luigi Pedroia, Via Cadogno 1, 6648 Minusio, Switzerland

[21] Appl. No.: 425,847

[22] Filed: Oct. 20, 1989

[30] Foreign Application Priority Data

Oct. 24, 1988 [CH] Switzerland ............... 3935/88

[51] Int. Cl.$^5$ ............................................. B65H 75/14
[52] U.S. Cl. ........................... 242/118.4; 289/18.1; 452/198
[58] Field of Search ............... 242/118.4, 118.6, 118.7, 242/118.8, 159, 176; 17/33, 34, 35; 289/2, 18.1

[56] References Cited

U.S. PATENT DOCUMENTS

| 19,909 | 6/1890 | Brockway | 242/118.4 X |
| 1,260,512 | 3/1918 | Chase | 242/118.4 |
| 1,634,899 | 7/1927 | Fredrick | 242/118.4 |
| 1,696,256 | 12/1928 | Rock | 242/118.4 |
| 4,401,329 | 8/1983 | Pedroia | 289/18.1 |

FOREIGN PATENT DOCUMENTS 2559171 10/1976 Fed. Rep. of Germany ......... 17/34

*Primary Examiner*—Stanley N. Gilreath
*Attorney, Agent, or Firm*—Young & Thompson

[57] ABSTRACT

A reel for twine for a machine for tying knots, the reel having two heads and a hub that interconnects and is rotatable relative to the heads, and a plurality of rolling elements spaced about the periphery of each head and protruding outwardly from each head and adapted to roll on the interior of a guide housing of a machine for tying knots. Two adjacent rolling elements contact and roll about the interior of the casing, and this prevents the bodily rotation of the reel that would occur if the heads were round and free to roll.

2 Claims, 2 Drawing Sheets

REEL FOR TWINE FOR A MACHINE FOR TYING KNOTS

This invention has as its object a reel with twine or the like for a machine able automatically to tie and knot meat packed in casings, a reel making it possible to avoid unwinding the twine by inertia in its phase of descent within a suitable guide housing.

There is known from a previous Swiss patent of the same holder, a "Machine for automatically tying by twine or the like, with a knot, meat packed in casings" (patent CH No. 587,610, filed Oct. 29, 1975), a machine comprising a reel with twine—mobile in a large cylindrical guide housing during its phase of tying and knotting the meat packed in a casing—which goes through the housing in an axial direction.

A drawback in the use of said machine has been noted: the outside flanges of the reel, which are circular, touching the inside walls of the housing during the phase of descent of the twine to resume its initial position after having made a knot, rotate by friction causing an undesirable unwinding of the twine from the reel, an unwinding that increases the length of the amount of twine that must be rewound before starting the making of a new knot.

This leads to a considerable loss of time which lowers by 25-35% the working speed of the machine, with a serious loss at the end of a working day (consider that the machine can produce 32-50 knots the first minute!).

The reel according to the invention completely eliminates said drawback.

It is characterized in that its two heads, of square or equivalent shape, carry a rolling element in the vicinity of each vertex.

Figure 2:
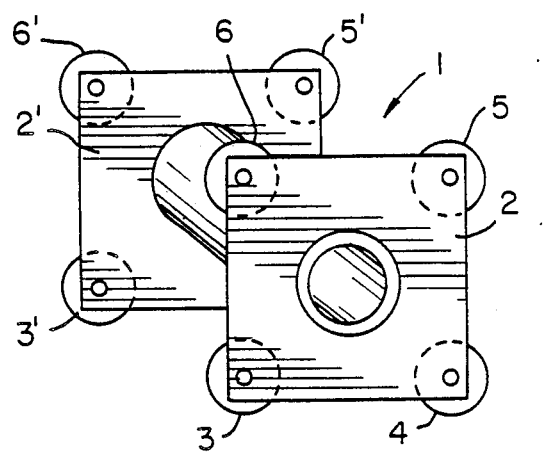
Figure 4:
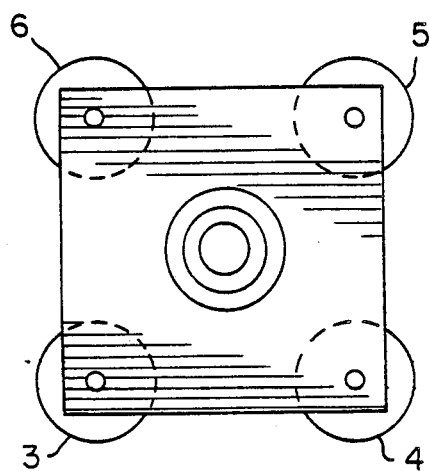
Figure 3:
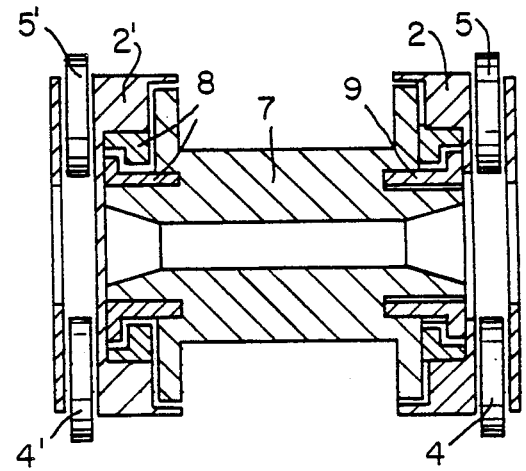
Figure 5:
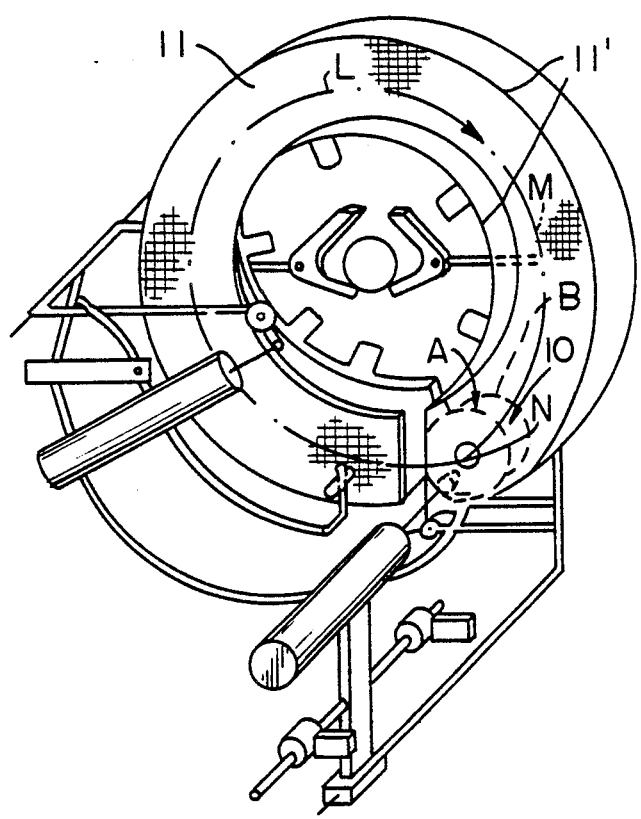

The accompanying drawings represent:

in FIG. 1, the perspective view of a reel according to the prior embodiment, exhibiting said drawbacks;

in FIG. 2, the diagrammatic perspective view of a preferred nonlimiting, nonbinding embodiment according to the invention;

in FIG. 3, the axial section of the reel of FIG. 2;

in FIG. 4, the lateral view of the reel of FIG. 3; and in FIG. 5, the perspective view of a reel according to the prior art, installed on a machine inside its guide housing.

With reference to FIG. 1: the reel, of known type, comprises two circular heads A and B, connected by hub C to two walls as B' connected together by rolling elements D.

The drawback presented by said reel is shown in FIG. 5 and consists in the fact that in the phase of descent of the reel 10 itself within its cylindrical guide housing 11 along line LMM, the heads A and B, touching the inside walls of said housing 11, are put in rotation. In addition, the inside part C (FIG. 1) with B' carrying the twine, either by the friction of rolling elements D or by the inertia of inside part C with B', is put into rotation so as to unwind the twine, which is lengthened by a certain amount, causing a discrete loss of time to rewind it at the beginning of a new knot.

On the other hand, the reel according to the invention exhibits (FIGS. 2, 3, and 4) two heads 2, 2' (FIG. 2), square in shape, and carrying in the vicinity of each vertex a rolling element 3, 4, 5, 6, or 3', 4', 5', 6'.

Thanks to this configuration, rotation of the two heads 2, 2' by friction along the inside walls of housing 11 is prevented.

Bearings 8 and 9, placed between hub 7 and the two heads 2, 2', thus allow the rotation of hub 7, carrying the twine (not represented), only when a knot is made, and not accidentally.

The speed of the machine, on which the reel is mounted, according to the invention can therefore be increased considerably as indicated above.

The shape of the various parts constituting the reel can vary in line with what is claimed, without going outside the scope of protection of the patent.

I claim:

1. A reel for twine for a machine for tying knots, the reel having two heads and a hub that interconnects and is rotatable relative to the heads, and a plurality of rolling elements spaced about the periphery of each head and protruding outwardly from each head and adapted to roll on the interior of a guide housing of a said machine for tying knots.

2. A reel as claimed in claim 1, in which said heads are square in shape and carry at each vertex a said rolling element.

* * * * *